Figure 1:
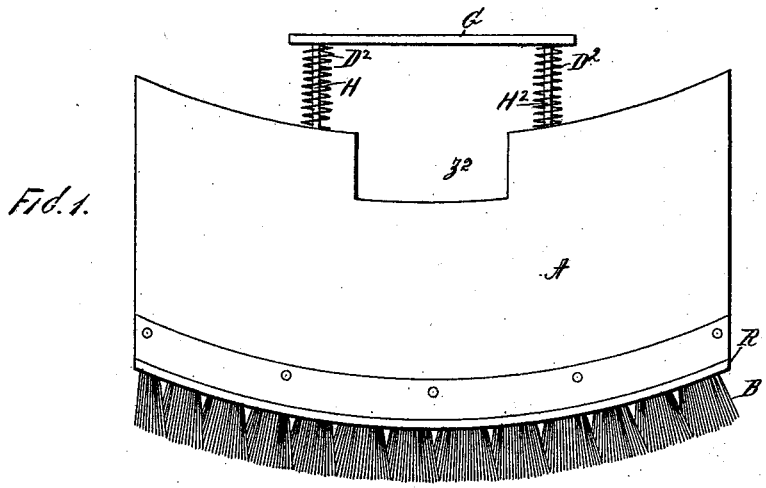

(No Model.)  5 Sheets—Sheet 1.

O. ROTHROCK.
TRACK CLEARER.

No. 523,595.  Patented July 24, 1894.

Witnesses:
John Buckler,
L. H. Osgood.

Inventor:
Oscar Rothrock,
By Worth Osgood,
Attorney.

(No Model.)  5 Sheets—Sheet 2.
O. ROTHROCK.
TRACK CLEARER.
No. 523,595. Patented July 24, 1894.
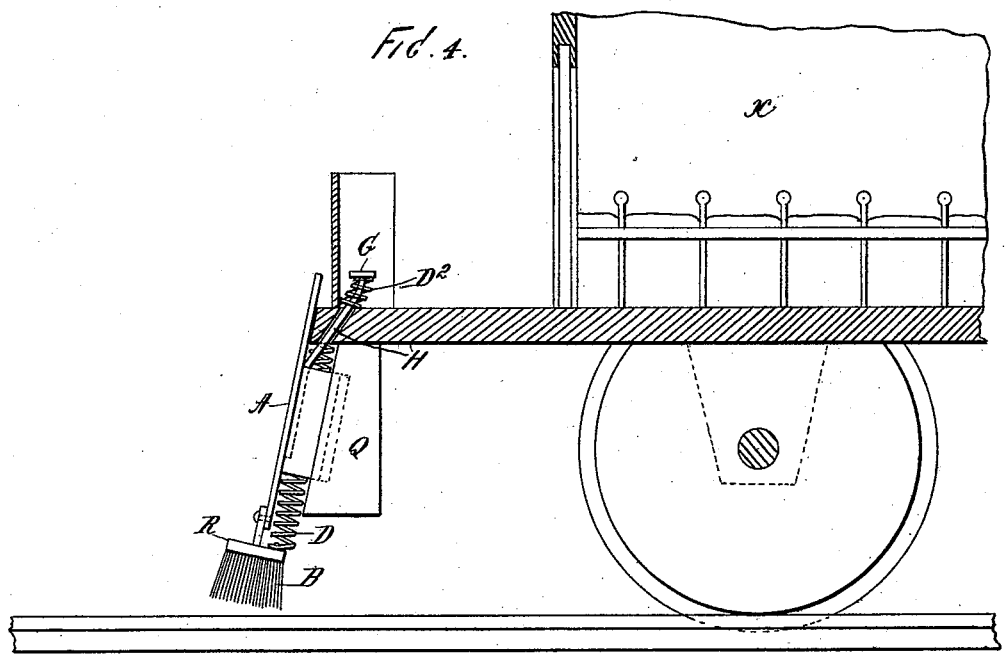
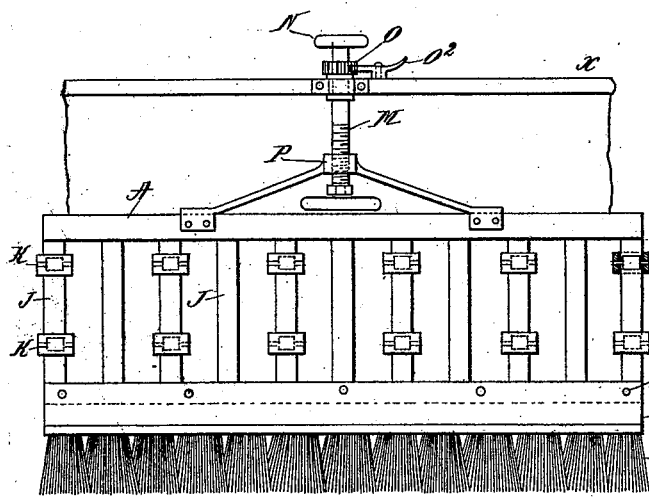
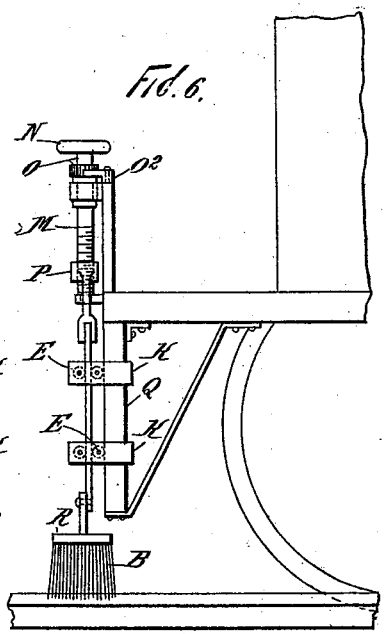
Witnesses:
John Buckler,
L. H. Osgood.
Inventor
Oscar Rothrock,
By Worth Osgood,
Attorney.

(No Model.) 5 Sheets—Sheet 3.
O. ROTHROCK.
TRACK CLEARER.
No. 523,595. Patented July 24, 1894.
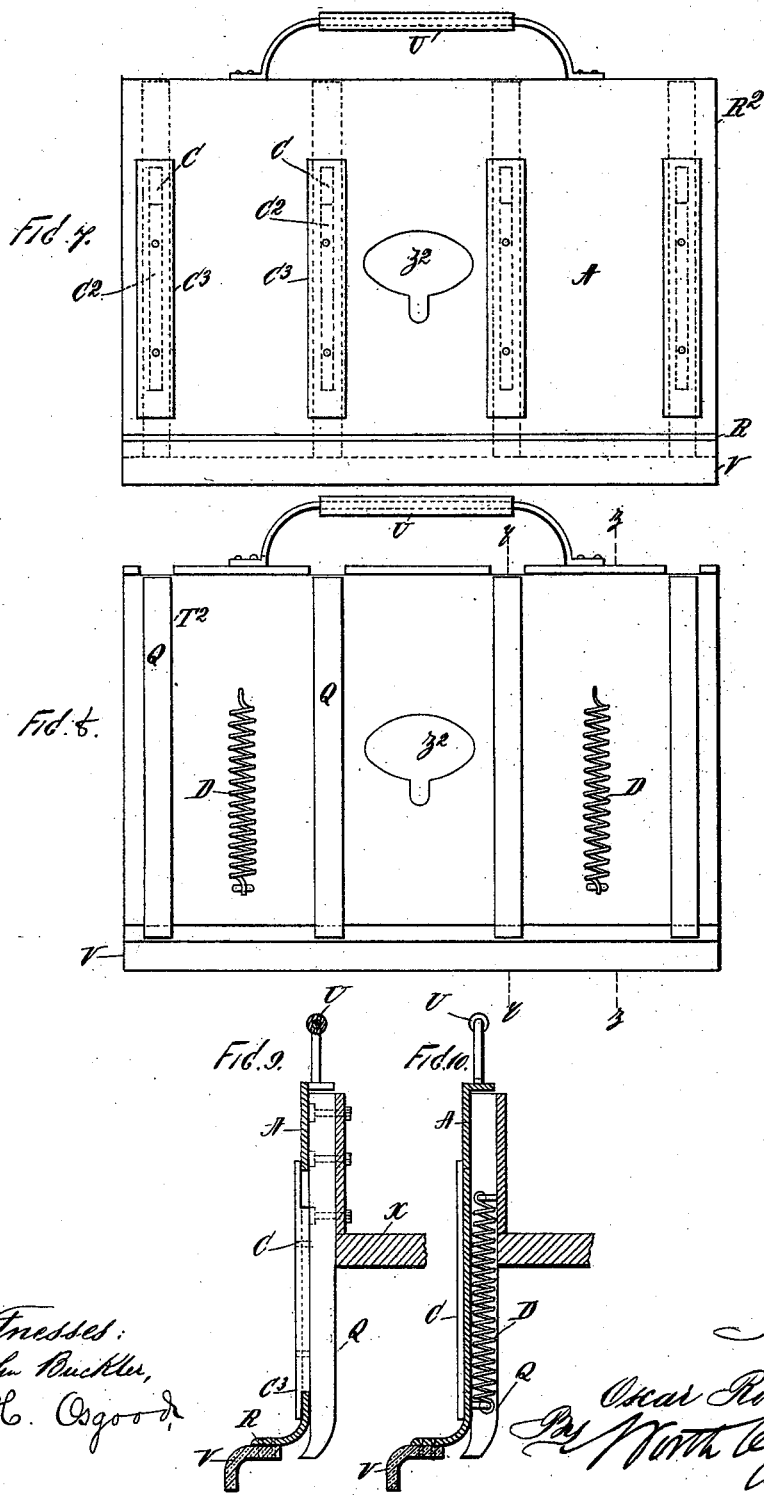

(No Model.) 5 Sheets—Sheet 4.

O. ROTHROCK.
TRACK CLEARER.

No. 523,595. Patented July 24, 1894.

Witnesses:
John Buckler,
L. H. Osgood.

Inventor:
Oscar Rothrock,
By ........ Attorney.

(No Model.) 5 Sheets—Sheet 5.
O. ROTHROCK.
TRACK CLEARER.
No. 523,595. Patented July 24, 1894.
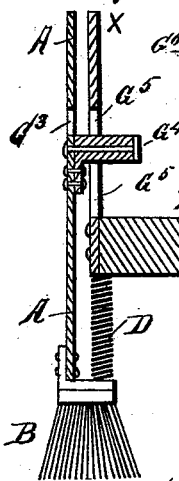
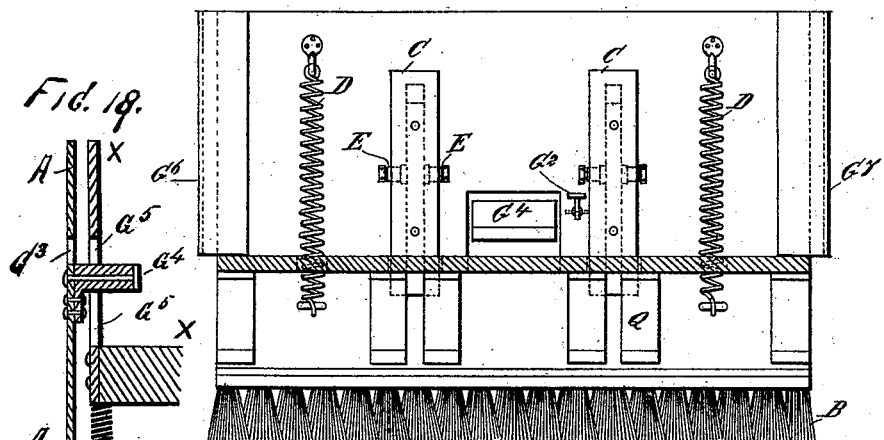
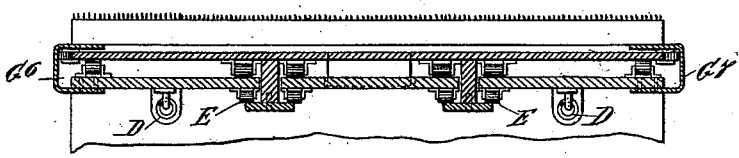
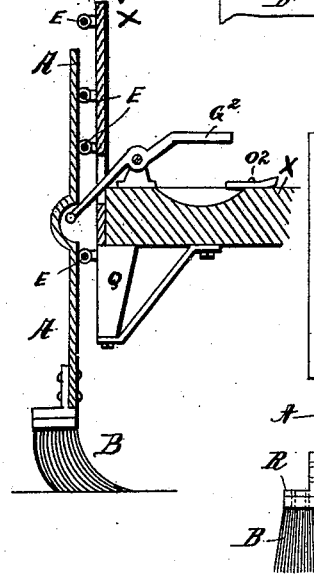
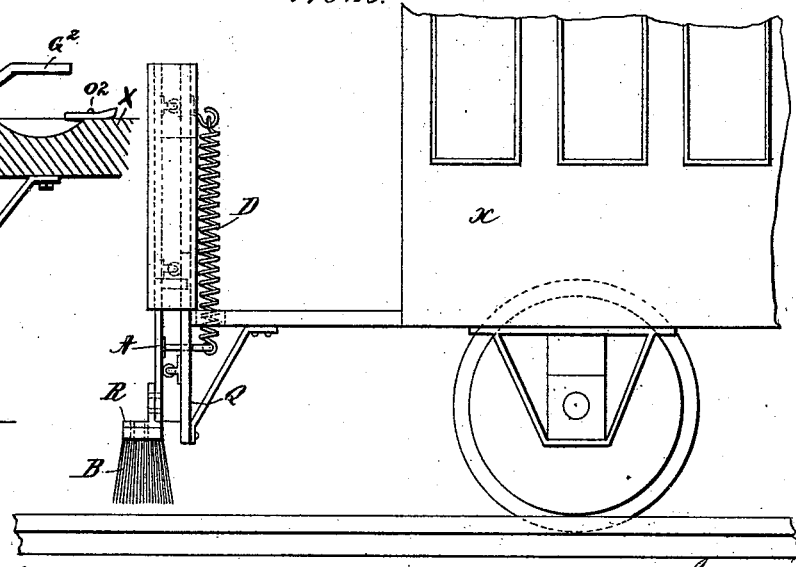
Witnesses:
Jno. Buckler,
L. H. Osgood.
Inventor:
Oscar Rothrock,
By Worth Osgood
Attorney.

UNITED STATES PATENT OFFICE.

OSCAR ROTHROCK, OF NEW YORK, N. Y.

TRACK-CLEARER.

SPECIFICATION forming part of Letters Patent No. 523,595, dated July 24, 1894.

Application filed December 6, 1893. Serial No. 492,899. (No model.)

*To all whom it may concern:*

Be it known that I, OSCAR ROTHROCK, of New York city, county and State of New York, have invented certain new and useful Improvements in Track-Clearers, of which the following is a full, clear, and exact description, reference being had to the accompanying drawings, and to the letters of reference marked thereon.

This invention relates to track clearing devices especially adapted for street cars, its object being to sweep clean the space over and between the rails, or the roadway in front of a vehicle, and as far as possible prevent injury to persons or animals coming directly in front of the vehicle by lifting such persons or animals, and also to throw all small objects to one side to prevent the vehicle from passing over them as now frequently occurs in the use of street cars and other vehicles carrying no suitable mechanism for clearing the way.

This device is an improvement on those shown in Letters Patent issued to me July 10, 1883, No. 280,959, and April 15, 1884, No. 297,012.

My present improvement involves a sheath or shield and pilot (or pilot without a sheet covering in rare instances) to be operated by the vehicle driver or motor man, in the manner and by means of the following described and illustrated mechanism.

In the drawings, X is the vehicle; A the shield; B broom at bottom of shield; C slideways; $C^2$ $C^3$ projecting parts and cleats on shield to secure it to a frame; D springs secured to shield and frame or car; $D^2$ $D^3$ springs under foot board; E friction rollers secured to shield and frame; F plates securing broom to shield; G foot board; H $H^2$ bars from shield to foot board; J the bar part of frame used for shield A; K K loops securing this shield frame to rigid parts behind it; L bolts securing broom to shield; M upright threaded bar to control movements of shield; N handle or wheel part of bar M; O ratchet wheel and catch to bar M; $O^2$ finger to lock bar M or shield; P threaded seat for bar M; Q frame used to secure shield to vehicle; R bottom projecting part of shield A; $R^2$ part of shield A extending up the dash board; V hard rubber bottom part of shield; U handle secured to top of shield; Y Y openings in shield for a half circle bumper iron; $Z^2$ an opening in shield for the bumper and also for a drawhead when used; $G^2$ pedal lever sometimes used to facilitate upward movement of shield; $G^3$ an opening in shield, and $G^4$ a cleat on same, to enable attendant to bear with great force with his foot directly on shield; $G^5$ an opening in dash board of vehicle to receive foot of attendant or cleat on back of shield; $G^6$ $G^7$ corner plates securing shield to dash board and frame; $G^8$ $G^9$ openings in dash board for securing slides.

Figure 2:
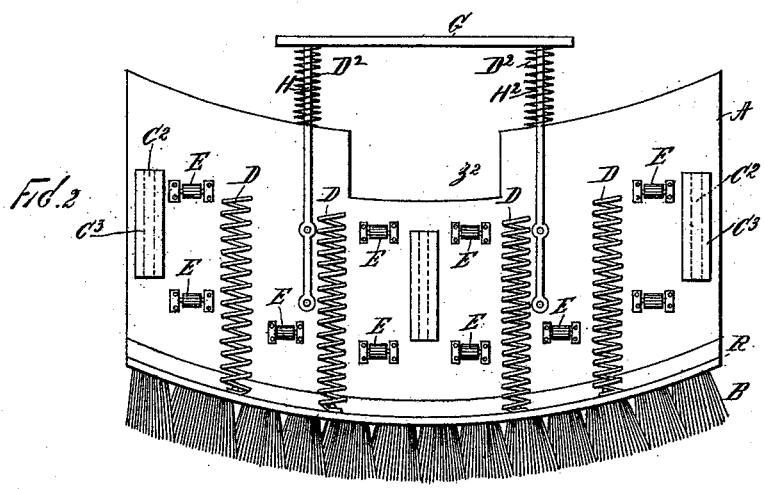
Figure 3:
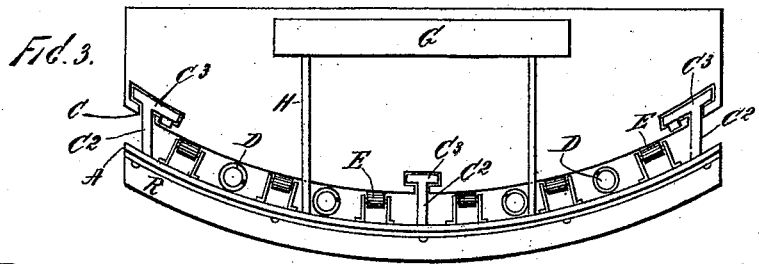
Figure 11:
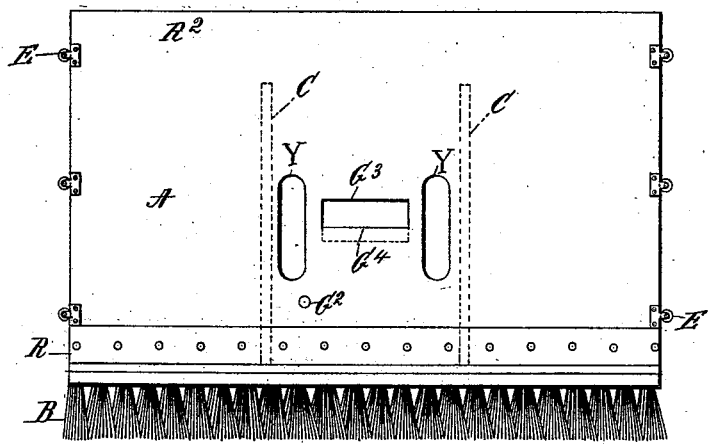
Figure 12:
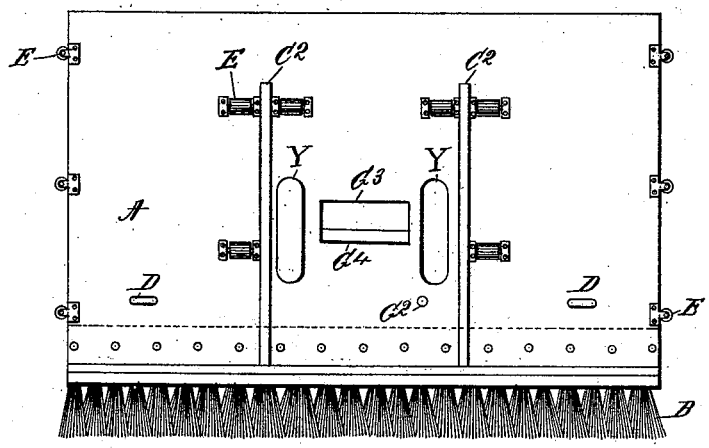
Figure 13:
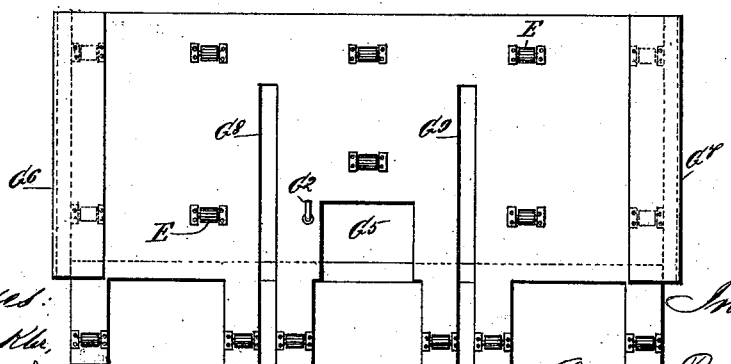

Figure 1 is a front view of shield and parts detached. Fig. 2 is a rear view of shield and connections corresponding with Fig. 1. Fig. 3 is a top view of shield corresponding with Figs. 1 and 2, and Fig. 4 is a sectional elevation showing same in place. Fig. 5 is a front view of frame used as a shield without covering sheet. Fig. 6 is a side elevation of shield, attached to car, having no covering sheet. Fig. 7 is a front view of shield having a lower projecting part, hard rubber bottom, upward extension, cleats or holding parts of rear frame, opening for draw head and bumper, and handle. Fig. 8 is a rear view of shield having lower outwardly extending and upward extending parts, with bars to form connection to vehicle and slides for shield, springs, opening for draw head and bumper, and handle. Fig. 9 is a sectional view on line $y.\ y.$ Fig. 8. Fig. 10 is a sectional view on line $z.\ z.$ Fig. 8. Fig. 11 is a front view of shield showing upper extension, lower extension with broom held to bottom of same, openings for half circle bumper, opening in shield for foot of attendant, and rollers on corners of shield. Fig. 12 is a rear view of shield, showing rollers on shield, foot rest, opening for foot, attachment of pedal lever, attachment of springs, and slides to operate in openings in dash board. Fig. 13 is a front view of dash board and frame below (as with shield detached) showing openings in dash board to receive holding slides, rollers on face of dash board and frame, opening in dash board for foot rest, and opening for pedal lever. Fig. 14 is a view of rear of dash board as it appears from car door, showing springs at rear of dash board, attachment of corner plates, pedal lever and attachment, cleat or foot rest part of shield operating in opening, and holding cap of cleat with rollers between dash board and holding cap. Fig. 15 is a cross sectional view through shield and dash board of Fig. 14. Fig. 16 is a side elevation corresponding with Figs. 11 to 15.

In Figs. 1 to 4 and 7 to 16, the shield A is made of a sheet of metal for the body part, one or two sheets of metal being bolted at the bottom to this and to the heads of a series of stiff steel wire or whisp brushes B. These brushes (or a single brush) are made from two to twelve inches thick and three to twelve inches long, depending upon the service, and may touch or nearly touch the roadway at all times, the body of the shield being carried so it never touches the ground even if the vehicle swings excessively by reason of irregularities of the road. This shield is placed on or under or between two parts of a frame of iron or wood attached to the vehicle. Generally the frame parts are placed under a vehicle at each end and the shields fitted on in front, extending some distance up dash boards, openings being left for the bumper, or for both bumper and draw head when used.

Springs D are attached to the stays and to the shield to raise the latter after being forced down. Springs $D^2 D^3$ may also be attached to the bottom of the vehicle and to the foot board G, used in this case, to force down the shield. Either or both of these sets of springs may be dispensed with in certain cases.

Slide ways C are provided with projecting parts $C^2$ and cleats $C^3$ (beneath or above the securing frame as required) to hold the shield in position, and rollers E are attached to both the frame and shield to facilitate the movements of the latter.

One, two, or more (in the illustration two) bars $H H^2$ are attached to the shield (generally at a point eight to ten inches from the top, and to the back of the shield) and pass through the bottom of the platform or timbers of the vehicle and are provided with a part (G) to be trod on by attendant when necessary to clear the way. This foot board (G) can be placed close to the dash board or in a recess so as not to obstruct the platform.

The bars or parts $H H^2$ may pass up in front of a dash board so the shield may be operated by hand. A single bar, or bars $H H^2$ may be used without the foot board, a head being formed on them for the foot to rest on.

In Figs. 5 and 6 a frame shield J is shown and a threaded bar M and threaded bar seat P with a wheel or handle N to raise and lower the shield. This bar M, has one, two or more attachments to the shield by means of the threaded seat P, or properly speaking the extensions of the threaded part P are attached to shield, the bar M screwing through the seat P. The bar M is generally placed in the center of the dash board, but occupies a position at either side when other gearing occupies the center, and is attached by socket holders to the dash board or both car timbers and dash board, passing upward on either side of dash board. A ratchet wheel O is pinned to bar M and finger $O^2$ held to part of vehicle. These parts are generally located near the foot of bar M but may be placed near top as shown. The ratchet wheel O may be omitted and finger $O^2$ work under a part of shield. This frame J made of iron or wood moves in holding bands K attached to stationary bars Q behind it, rollers E being placed between the bands and ribs of the shield attached to and also between the shield bars and bars Q. This frame J is illustrated with a bottom broom B, but may have a bottom of hard rubber. Generally the bottom bar of the shield above broom forms the extension R.

In Figs. 7, 8, 9 and 10, the shield has a bottom broom of hard rubber V. This rubber is cast or otherwise made from one to three inches thick, three to twelve inches long, and secured to the body of the shield in the same manner as the brush. The stays Q are attached to the vehicle and have projecting slideways C and cleats $C^3$ to secure the shield. Springs D are attached to shield and to car. As stated, the frame portion of the shield is generally placed under the vehicle directly at the end, but both shield and frame may be placed in front, and in this case, an opening $Z^2$ is made in the shield for a draw-head when used, and this opening is either enlarged to receive a bumper, or openings Y Y made for it.

The shield is generally provided with an outwardly extending part R at the bottom to catch or steady a person or object falling or coming directly in front, thus enabling the person to grasp the car above, his foot resting on the projection, or enabling the motor man to grasp and hold the person, or any small object, until the vehicle stops. This shield can be carried at all times high enough to prevent wrecking the vehicle and in its lowest position effectively prevents the vehicle passing over persons or objects. It is also effective in removing light snow.

When the shield extends up the front of a vehicle as a dash board (see Fig. 7) no levers or foot boards are used, the attendant bearing directly on the top of the shield, or upon a handle U. The ordinary dash-board in this case can be dispensed with, but when used the springs D, to push or pull, can be placed between the dash board and shield, with or without holders running through the center of them.

The springs can be placed behind the dash board (as in Figs. 14 and 16), the rollers E being placed both in front and behind the dash board, on the corners of the shield, and between the holding cleats and shield (see Figs. 11 to 16). Openings $G^8 G^9$, Fig. 13, are made in dash board for headed slide strips or cleats C. The pedal lever $G^2$ attached to shield and hinged on dash board or floor of car (as in Figs. 14 and 17) may be used to lower or raise a shield. In this case (Fig. 14) I use this lever $G^2$ to assist very light springs in raising a somewhat heavy shield. An opening $G^5$ (Figs. 12 and 16) is provided in dash-board of car and if desired also in shield (opening $G^3$ Fig. 11) to enable attendant to place his foot directly on a part of the shield, his hands being occupied with other gearing. A cleat or foot rest $G^4$ (Fig. 12) of any length is placed on back of shield. This foot rest operates in an opening in dash board and will generally be substituted for the opening $G^3$ in shield. The opening $G^3$ and cleat $G^4$ are used together to give greater purchase power to attendant.

It should be understood that the foot board G can be used with frame shield J (Figs. 5 and 6) or bar M and gearing (Figs. 5 and 6) used with shield A (Fig. 1). When no springs are used the shield is lifted by the threaded bar (Fig. 5) or by pedal lever $G^2$ (Figs. 13 and 14). When desired the head of brush B (Fig. 1) may project to form the foot rest R.

Having now described the invention, what I claim is—

1. In a vehicle, a vertically movable shield placed at the end of vehicle to clear the way, with rollers attached to shield or to a rigid frame at back of shield to facilitate movements of shield, with suitable holding strips to secure the shield to said frame, a foot board attachment for lowering, and springs for raising the shield, substantially as set forth.

2. In a street car or other vehicle, the shield A and the rubbing surface, with springs D, slideways C, cleats $C^2$, rollers E, and controlling springs $D^2$ by means of which the shield is moved vertically.

3. In a vehicle, the combination of the vertically movable shield, rollers E, means for returning the shield, and a lever for forcing the shield down, substantially as described.

4. In a street car or other vehicle, the movable shield, with the pedal lever $G^2$ for raising the shield, and the lever G for lowering the same, substantially as set forth.

5. In a vehicle, the movable shield, with the opening in the dash board and opening in the shield for the foot of an attendant for the purpose of lowering the shield, and means, substantially as described for raising the same, substantially as set forth.

6. In a vehicle, the movable shield having a projection on rear to receive the foot of attendant to force it down, with means for raising the same, the shield being constructed with slide or roller ways, substantially as set forth.

7. In a vehicle, the movable shield, with suitable devices for securing it to the dash board, rollers applied between the stationary and movable parts, means for raising the shield, and a foot rest on the shield for forcing the shield down when necessary to clear the way, substantially as set forth.

8. A car having the front shield bodily movable vertically, guides therefor, springs for yieldingly holding the shield raised, said shield having a foot piece extending above the platform of the car, whereby the shield can be forced down, substantially as described.

In testimony that I claim the foregoing I have hereunto set my hand in the presence of two witnesses.

OSCAR ROTHROCK.

Witnesses:
JOHN BUCKLER,
WORTH OSGOOD.